US006535401B2

(12) United States Patent
Beij et al.

(10) Patent No.: US 6,535,401 B2
(45) Date of Patent: Mar. 18, 2003

(54) CIRCUIT ARRANGEMENT

(75) Inventors: Marcel Beij, Eindhoven (NL); Arnold Willem Buij, Eindhoven (NL); Everaard Marie Jozef Aendekerk, Eindhoven (NL); Wilhelmus Hinderikus Maria Langeslag, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/040,187

(22) Filed: Oct. 23, 2001

(65) Prior Publication Data

US 2002/0093838 A1 Jul. 18, 2002

(30) Foreign Application Priority Data

Oct. 25, 2000 (EP) ........................................ 00203698

(51) Int. Cl.[7] ........................ H02M 5/447; G05F 1/46

(52) U.S. Cl. ........................................ 363/37; 323/283

(58) Field of Search .............................. 363/37, 39, 65, 363/71; 323/282, 285; 315/290, 291, 307, 360

(56) References Cited

U.S. PATENT DOCUMENTS

| | | | | | |
|---|---|---|---|---|---|
| 5,103,462 | A | * | 4/1992 | Elle et al. | 375/22 |
| 5,568,044 | A | * | 10/1996 | Bittner | 323/272 |
| 6,107,754 | A | * | 8/2000 | Kim | 315/291 |
| 6,222,745 | B1 | * | 4/2001 | Amaro et al. | 363/65 |

* cited by examiner

*Primary Examiner*—Rajnikant B. Patel

(57) ABSTRACT

A ballast circuit comprises an inverter formed by a bridge circuit. The power consumed by a lamp connected to the ballast circuit is controlled by controlling the duty cycles of control signals that drive the bridge switches. The duty cycle is proportional to digital signals generated by a pulse duration modulator included in a microprocessor. To increase the number of settings to which the lamp power can be set, the digital signals are modulated.

21 Claims, 3 Drawing Sheets

CIRCUIT ARRANGEMENT

BACKGROUND OF THE INVENTION

This invention relates to a circuit arrangement for energizing a discharge lamp comprising;

- input terminals which are to be connected to a DC voltage source,
- an inverter coupled to the input terminals for generating a lamp current from the DC voltage supplied by the DC voltage source, which inverter comprises
- a switching element coupled to the input terminals,
- a control circuit coupled to a control electrode of the switching element, which control circuit serves to generate a control signal for rendering the switching element alternately conducting and non-conducting, and
- a pulse duration modulator which is coupled to the control circuit and which sets the duty cycle of the control signal duty cycle being directly proportional to a digital signal present at an output of the pulse duration modulator.

Such a circuit arrangement is well known. In such a circuit arrangement, the duty cycle of the control signal can be set in a readily reproducible manner, independent of, for example, the ambient temperature. A drawback of such a circuit arrangement is, however, that not every value of the duty cycle of the control signal can be set since a digital signal is composed of a limited number of bits. As a result, also the power consumed by a lamp energized by means of the circuit arrangement has only a comparatively small number of settings.

SUMMARY OF THE INVENTION

It is an object of the invention to provide a circuit arrangement enabling not only the duty cycle of the control signal and hence the power consumed by a discharge lamp energized by means of the circuit arrangement to be very reproducibly adjustable, but also enabling the average value of the duty cycle of the control signal and the average value of the power consumed by the lamp to be set to a comparatively large number of settings.

To achieve this, a circuit arrangement as mentioned in the opening paragraph is characterized, in accordance with the invention, in that said pulse duration modulator is further provided with a circuit part M for periodically modulating the digital signal, each period of this modulation comprising a first time interval wherein the digital signal has a first value, and a second time interval wherein the digital signal has a second value, said first and said second value being independently adjustable by the circuit part M.

The modulation of the digital signal leads to a modulation of the duty cycle of the control signal and to a modulation of the power consumed by the lamp. If the first and the second value of the first digital signal are chosen to be different, the value of the duty cycle of the control signal and hence the power consumed by the lamp during the first time interval corresponds to the first value of the digital signal and, during the second time interval, to the second value of the digital signal. The average power consumed by the lamp in a period of the modulation ranges between the value of the lamp power corresponding to the first value of the digital signal and the value of the lamp power corresponding to the second value of the digital signal. By virtue thereof, the average value of the lamp power can be set to a number of settings exceeding the possible number of values of the digital signal.

Preferably, each period of the modulation comprises N successive time intervals, N being a natural number larger than or equal to 2, and the value of the digital signal during at least one of these time intervals can be set by the circuit part M at a value that differs from the value during one of the other time intervals. The number of possible settings of the lamp power increases as the value chosen for N increases.

The circuit part M for periodically modulating the digital signal can be embodied so as to be comparatively simple if each one of the N time intervals is of equal duration. Preferably, the circuit part M comprises a timer for "timing" the successive time intervals.

The circuit part M may be additionally provided, however, with a circuit part M' for setting the duration of one time interval or of each one of the successive time intervals. By setting the duration of at least one of said successive time intervals, it is possible to set the average value of the duty cycle of the switching elements and hence the average value of the power consumed by the lamp. In this case, N is preferably equal to 2 because this enables the structure of the circuit part M' to be comparatively simple. Setting the duration of one time interval or of each of the time intervals in a modulation period is particularly advantageous in embodiments of a circuit arrangement in accordance with the invention wherein a microprocessor is used to form the circuit part M. It has been found that a high resolution of the adjusted lamp power can be brought about by using only a small part of the "CPU time" of the microprocessor.

In a preferred embodiment of a circuit arrangement in accordance with the invention, the inverter does not comprise a single switching element but a bridge circuit provided with a series arrangement of a first switching element and a second switching element, which series arrangement also interconnects the input terminals, and outputs of the control circuit are coupled to respective control electrodes of the switching elements, and the control circuit generates a first control signal and a second control signal for rendering, respectively, the first and the second switching element conducting and non-conducting. This preferred embodiment can be embodied such that the duty cycles of the first and the second control signal are equal and directly proportional to the digital signal present at the output of the pulse duration modulator. It is alternatively possible, however, to modulate the first and the second control signal in the same manner and, subsequently, subject the first control signal to a phase shift relative to the second control signal. This phase shift does not influence the lamp power, but causes the modulation of the luminous flux of the lamp resulting from the modulation of the duty cycle of the control signal to be suppressed.

The preferred embodiment can also be embodied such that the duty cycles of the first and the second control signal can be independently modulated. Instead of one pulse duration modulator, the circuit arrangement is provided, in such an embodiment, with a first pulse duration modulator for setting the duty cycle of the first control signal and with a second pulse duration modulator for setting the duty cycle of the second control signal, the duty cycle of the first control signal being directly proportional to the value of a first digital signal present at an output of the first pulse duration modulator, and the duty cycle of the second control signal being directly proportional to the value of a second digital signal present at an output of the second pulse duration modulator, the first pulse duration modulator being provided with a first circuit part M1 for periodically modulating the first digital signal, and the second pulse duration modulator being provided with a second circuit part M2 for periodically modulating the second digital signal. In such an embodiment of the preferred embodiment, the average value of the duty cycle of the first control signal can be chosen to be different from the average value of the duty cycle of the second control signal, as a result of which the number of settings to which the lamp power can be set is increased further. The modulation frequencies of the first and the second control signal can be chosen to be equal or unequal.

These and other aspects of the invention will be apparent from and elucidated with reference to the embodiment(s) described hereinafter.

DESCRIPTION OF THE PREFERRED EMBODIMENTS

Figure 1:
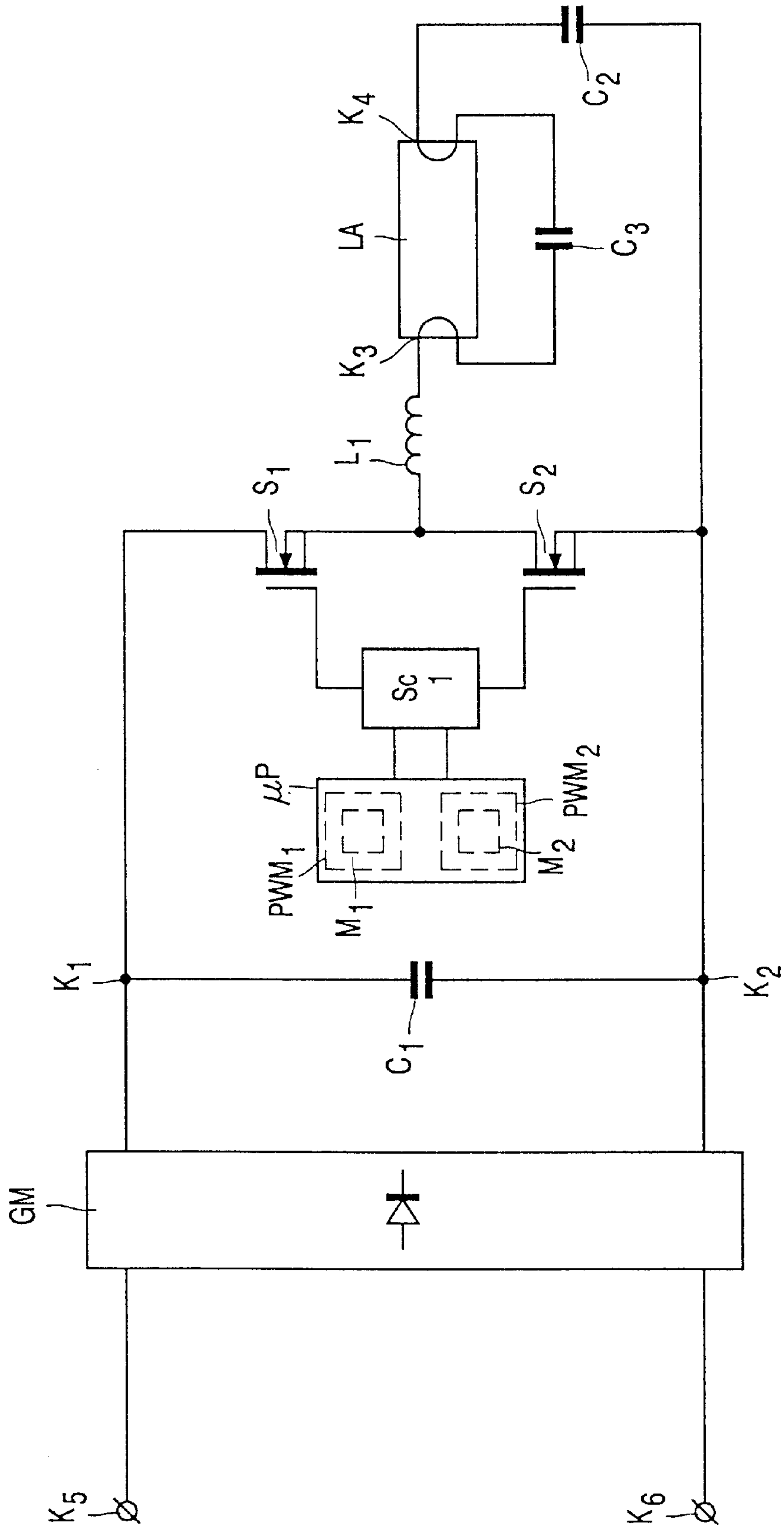
FIG. 1 shows a first example of a circuit arrangement in accordance with the invention.

In FIG. 1, K5 and K6 denote terminals which are to be connected to the poles of an AC voltage source supplying a low-frequency AC voltage. K5 and K6 are connected to respective inputs of rectifier means GM for rectifying the low-frequency AC voltage. Respective outputs of the rectifier means GM are connected to input terminals K1 and K2 which are to be connected to a DC voltage source. Input terminal K1 is connected to input terminal K2 by means of a capacitor C1. The DC voltage source is formed by the AC voltage source, the rectifier means GM and capacitor C1, which serves as a buffer capacitor. Capacitor C1 is shunted by a series arrangement of a first switching element S1 and a second switching element S2. A control electrode of switching element S1 is connected to a first output of control circuit Sc. A control electrode of switching element S2 is connected to a second output of the control circuit Sc. Control circuit Sc is a circuit part for generating a first control signal and a second control signal for rendering the first switching element S1 and the second switching element S2, respectively, conducting and non-conducting. A first input of the control circuit is connected to an output of a first pulse duration modulator PWM1. A second input of the control circuit is connected to an output of a second pulse duration modulator PWM2. Pulse duration modulators PWM1 and PWM2 are circuit parts for setting, respectively, the duty cycle of the first control signal and the duty cycle of the second control signal. These duty cycles are directly proportional to, respectively, a first digital signal which, during operation of the circuit arrangement, is present at the output of the first pulse duration modulator PWM1 and a second digital signal which, during operation, is present at the output of the second pulse duration modulator PWM2. The pulse duration modulators form part of a microprocessor μP. The first pulse duration modulator PWM1 is additionally provided with a first circuit part M1 for periodically modulating the first digital signal. In the example shown in FIG. 1, each period of the modulation of the first digital signal comprises four successive time intervals of equal duration. The circuit part M1 is capable of setting the first digital signal at a specific value during each one of said time intervals. The second pulse duration modulator PWM2 is additionally provided with a second circuit part M2 for periodically modulating the second digital signal. In the example shown in FIG. 1, each period of the modulation of the second digital signal comprises four successive time intervals of equal duration. The circuit part M2 is capable of setting the second digital signal at a specific value during each one of these time intervals.

Both circuit parts M1 and M2 comprise a timer for timing the successive time intervals in a period of the modulation of the first or the second digital signal. In the example shown in FIG. 1, the periods of the modulations of the first and the second digital signal are chosen to be equal. As a result, also the duration of each of the successive time intervals in a period of the modulation of the first digital signal is equal to the duration of each of the four successive time intervals in a period of the modulation of the second digital signal. By virtue thereof, a single timer that forms part of the microprocessor μP can form the timer comprised in circuit part M1 as well as the timer comprised in circuit part M2.

Switching element S2 is shunted by a load branch formed by a series arrangement of coil L1, lamp terminal K3, capacitor C3, lamp terminal K4 and capacitor C2. A discharge lamp LA is connected to the lamp terminals K3 and K4. The load branch, the microprocessor μP, the control circuit Sc and the switching elements S1 and S2 jointly form a bridge circuit.

Figure 2:
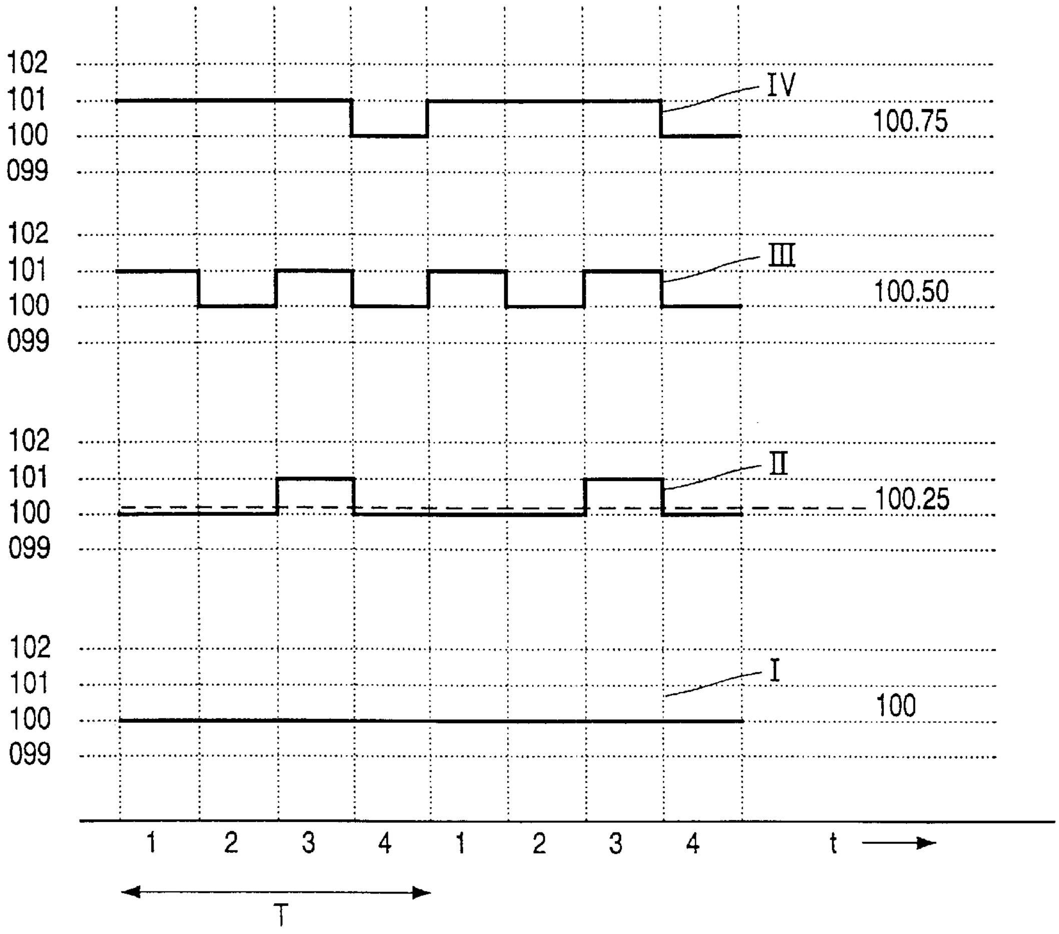
FIG. 2 shows an example of the decimal value of a first digital signal and a second digital signal which, during operation of the circuit arrangement shown in FIG. 1, are present at respective outputs of pulse duration modulators PWM1 and PWM2 forming part of the circuit arrangement shown in FIG. 1.

In FIG. 2, the time is plotted along the horizontal axis in arbitrary units. The digits 1–4 indicate successive time intervals in a period of the modulation of the first digital signal or the second digital signal. Along the vertical axis, the decimal value of the first or the second digital signal is plotted. T is the duration of a modulation period of the modulation of the first or the second digital signal.

The operation of the example shown in FIG. 1 is as follows. If terminals K5 and K6 are connected to an AC voltage source, the low-frequency AC voltage supplied by this AC voltage source is rectified, and a DC voltage is applied across capacitor C1. The control circuit Sc renders the switching elements alternately conducting and non-conducting at a frequency f. As a result, a substantially square-wave voltage is present across the load branch. Under the influence of said substantially square-wave voltage, an alternating current of frequency f flows in the load branch. If, during each of the four time intervals in a period of the modulation, the value of both the first and the second digital signal is equal to the same decimal value, then the duty cycle is constant over a modulation period and the average value of the duty cycle over a modulation period is the same for both control signals. This situation occurs, for example, if the first and the second digital signal are equal to the decimal value 100 during the entire modulation period, as is the case in curve I shown in FIG. 2. The corresponding lamp power has a first value. The setting of the lamp power can be increased to a second, higher value by setting both the first and the second digital signal at a higher value, for example decimal value 101, during one of the four time intervals in a modulation period. This occurs via the circuit parts M1 and M2. The resultant form of the first as well as the second digital signal is shown in curve II of FIG. 2. A further increase of the power to a third value can be achieved by setting each of the digital signals, during two time intervals, at the decimal value 101 in each period of the modulation. The resultant form of the first as well as the second digital signal is shown in curve III of FIG. 2. If the digital signals are both set so as to be equal to 101 during three time intervals in each modulation period, the modulation period-averaged duty cycle of both control signals exhibits a further increase. The average lamp power in a modulation period also exhibits a further increase to a fourth value. The form of the first as well as the second digital signal is shown in curve IV of FIG. 2. The lamp power can thus be set at three levels (the second, third and fourth value), which would not be possible if the first and the second digital signal were unmodulated and hence could only be set at a time-constant decimal value of 100 or 101. It is possible to extend the number of lamp-power settings by choosing a larger number of time intervals within a modulation period. However, this has the drawback that, in general, also the modulation period must be chosen to be longer, as a result of which the frequency of the modulation decreases and, possibly, can be observed by a user.

In the case of the example shown in FIG. 1, it is alternatively possible, however, to increase the number of settings of the lamp power by differently modulating the two digital signals. For example, the first digital signal can be chosen to be equal to curve I in FIG. 2, while the second digital signal is chosen to the equal to curve II in FIG. 2. In this case, the modulation period-averaged duty cycles of the first and the second control signal are different. In this case, the modulation period-averaged lamp power has a value ranging between the above-mentioned first and second values.

Figure 3:
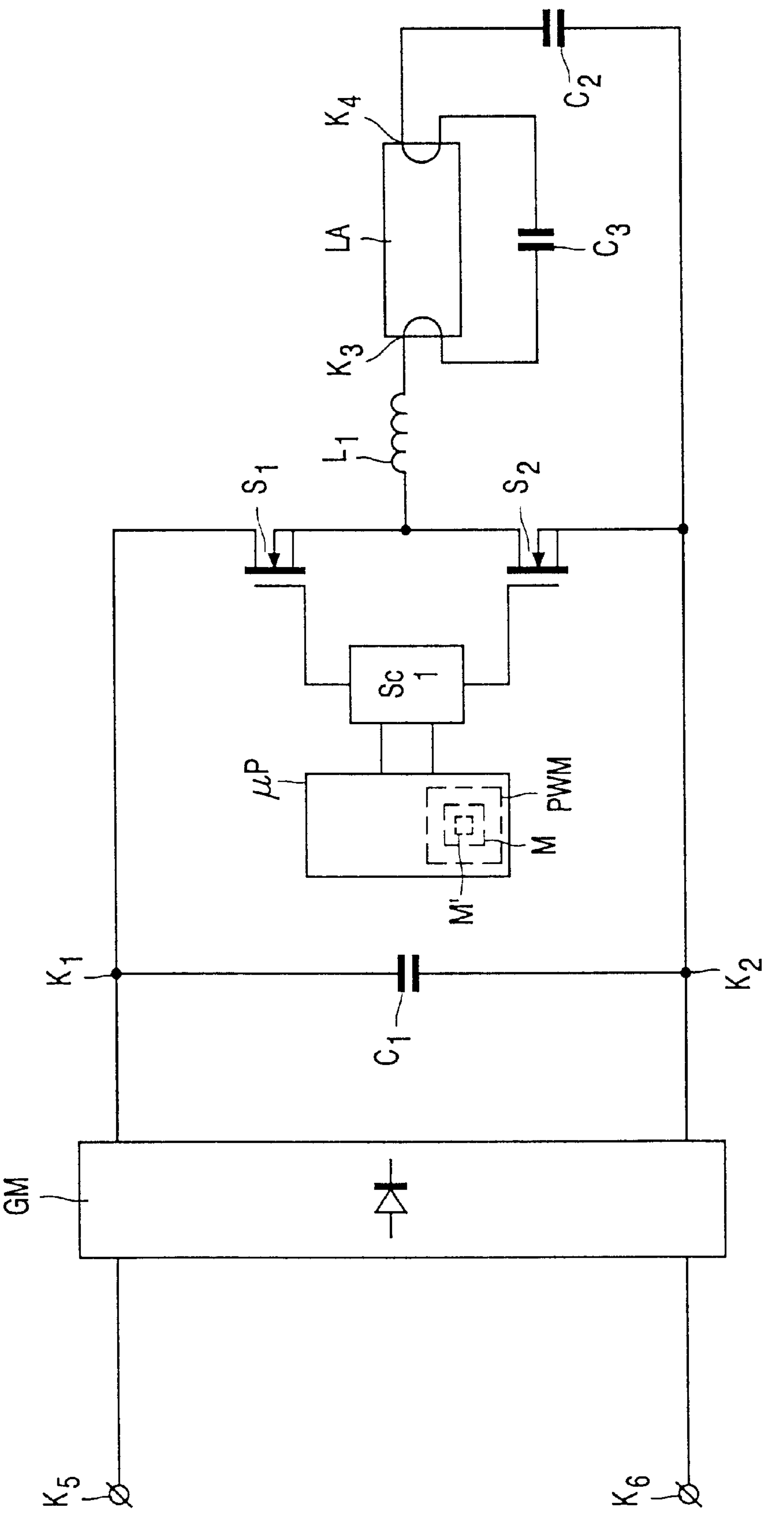
FIG. 3 shows a second example of a circuit arrangement in accordance with the invention.

The structure of the circuit arrangement shown in FIG. 3 substantially corresponds to that of the circuit arrangement shown in FIG. 1. The difference between the circuit arrangement shown in FIG. 3 and the circuit arrangement shown in FIG. 1 resides in that the microprocessor $\mu$P of the circuit arrangement shown in FIG. 3 comprises only one pulse duration modulator PWM instead of two. The pulse duration modulator PWM is provided with a circuit part M for periodically modulating the digital signal present at the output of the pulse duration modulator PWM. Circuit part M is provided with a circuit part M' for setting the duration of each one of the time intervals in a modulation period. The number of time intervals within a modulation period is chosen to be equal to 2.

Figure 4:
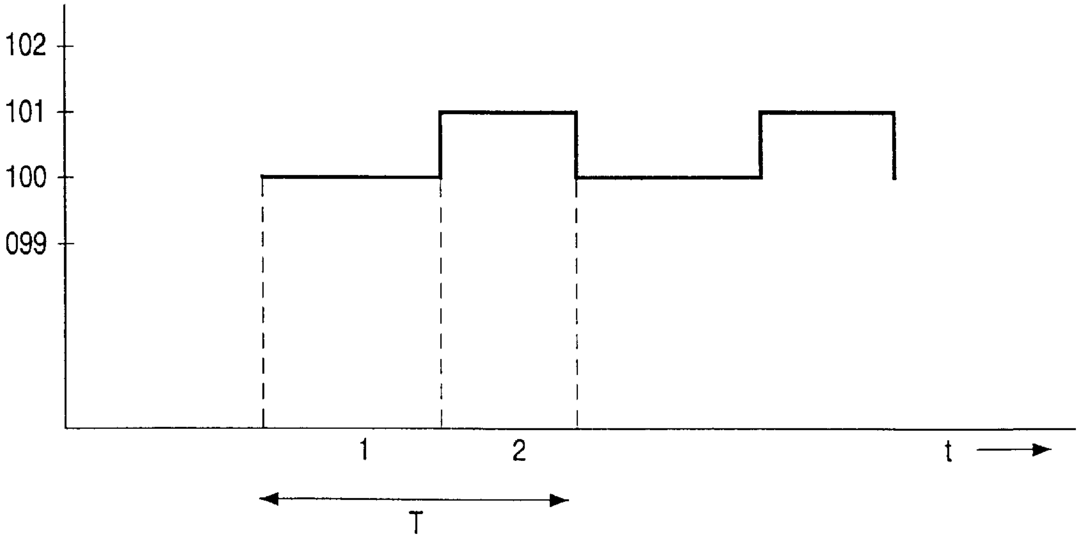
FIG. 4 shows an example of the form of the decimal value of a digital signal present, during operation of the circuit arrangement, at an output of a pulse duration modulator PWM forming part of the circuit arrangement shown in FIG. 3.

In FIG. 4, the time is plotted along the horizontal axis in arbitrary units. The digits 1 and 2 indicate successive time intervals in a period of the modulation of the digital signal. Along the vertical axis, the decimal value of the digital signal is plotted. T is the duration of a modulation period of the modulation of the digital signal.

The operation of the example shown in FIG. 3 is substantially the same as the operation of the example shown in FIG. 1. An important difference resides in that a user of the example shown in FIG. 3 is capable of setting the duration of the time intervals 1 and 2 by means of circuit part M'. In the example shown in FIG. 3, the duration T of a modulation period remains unchanged. If, for example, the duration of a modulation period T is chosen to be 1 msec, and the time intervals 1 and 2 can be set so as to be multiples of 10 $\mu$sec, then the modulation period-averaged value of the digital signal can be set at 99 levels situated between two successive values of the digital signal. In this manner, a very large number of average values of the power consumed by the lamp can be set. The resolution of the power set could be increased further by substituting the microprocessor $\mu$P in the circuit arrangement shown in FIG. 3 with a microprocessor provided with two pulse duration modulators, which are each provided with a circuit part M for modulating the digital signal at the output of the pulse duration modulator, so that the first and the second control signal can be differently modulated.

Practical embodiments of the examples shown in FIG. 1 and FIG. 3 can be realized in a simple manner by using the microprocessor Philips 80C552, which is provided with two pulse duration modulators, or by using the Philips 768 microprocessor.

What is claimed is:

1. A circuit arrangement for energizing a lamp comprising:

input terminals which are to be connected to a DC voltage source, an inverter coupled to the input terminals for generating a lamp current from the DC voltage supplied by the DC voltage source, which inverter comprises a switching element coupled to the input terminals, a control circuit coupled to a control electrode of the switching element, which control circuit serves to generate a control signal for rendering the switching element alternately conducting and non-conducting, a pulse duration modulator, which is coupled to the control circuit and which is used to set the duty cycle of the control signal, said duty cycle being directly proportional to a digital signal present at an output of the pulse duration modulator, characterized in that said pulse duration modulator is further provided with a circuit part M for periodically modulating the digital signal, each period of this modulation comprising a first time interval wherein the digital signal has a first value, and a second time interval wherein the digital signal has a second value, said first and said second value being independently adjustable by the circuit part M.

2. A circuit arrangement as claimed in claim 1, wherein each period of the modulation of the digital signal comprises N successive time intervals, N being a natural number larger than or equal to 2, and the value of the digital signal can be set, during at least one of said time intervals, by the circuit part M to a value that differs from the value during one of the other time intervals.

3. A circuit arrangement as claimed in claim 2, wherein the circuit part M further comprises;

a circuit part M' for setting the duration of one of the successive time intervals.

4. A circuit arrangement as claimed in claim 3, wherein the circuit part M' includes means for setting each of the time intervals in a period of the modulation.

5. A circuit arrangement as claimed in claim 3, wherein N is equal to 2.

6. A circuit arrangement as claimed in claim 2, wherein each of the N time intervals is of equal duration.

7. A circuit arrangement as claimed in claim 6, wherein the circuit part M comprises a timer for "timing" the successive time intervals.

8. A circuit arrangement as claimed in claim 3, wherein the inverter comprises a bridge circuit provided with a series arrangement of a first switching element and a second switching element, which series arrangement also interconnects the input terminals, and wherein outputs of the control circuit are coupled to respective control electrodes of the switching elements, and the control circuit generates a first control signal and a second control signal for rendering, respectively, the first and the second switching element conducting and non-conducting.

9. A circuit arrangement as claimed in claim 8, wherein the modulation period-averaged values of the duty cycles of the first and the second control signal are equal.

10. A circuit arrangement as claimed in claim 8, which comprises; a first pulse duration modulator for setting the duty cycle of the first control signal and a second pulse duration modulator for setting the duty cycle of the second control signal, the duty cycle of the first control signal being directly proportional to the value of a first digital signal present at an output of the first pulse duration modulator, and the duty cycle of the second control signal being directly proportional to the value of a second digital signal present at an output of the second pulse duration modulator, the first pulse duration modulator including a first circuit part M1 for periodically modulating the first digital signal, and the second pulse duration modulator including a second circuit part M2 for periodically modulating the second digital signal.

11. A circuit arrangement as claimed in claim 4, wherein N is equal to 2.

12. The circuit arrangement as claimed in claim 1, wherein the inverter comprises a bridge circuit including a series arrangement of a first switching element and a second switching element which interconnect the input terminals, and wherein outputs of the control circuit are coupled to respective control electrodes of the switching elements, and the control circuit generates a first control signal and a second control signal for rendering, respectively, the first and the second switching elements conducting and non-conducting, and a load circuit coupled to a circuit point between the first and second switching elements and including an inductor, a capacitor, and first and second output terminals for connection to a discharge lamp, wherein the inverter produces a square-wave output voltage at the circuit point for operation of a discharge lamp when said lamp is connected to the first and second output terminals.

13. A circuit for operating a discharge lamp comprising:

first and second input terminals for connection to a source of DC supply voltage, an inverter coupled to the input terminals for supplying an operating voltage for a discharge lamp, the inverter comprising;

at least a first controlled switching element coupled to the input terminals, a load circuit coupled to the first controlled switching element and including first and second output terminals for connection to a discharge lamp, a control circuit coupled to a control electrode of the first switching element, said control circuit deriving a control signal for making the first switching element alternately conductive and nonconductive, a pulse duration modulator having an output coupled to an input of the control circuit so as to supply thereto a digital signal which adjusts the duty cycle of the control signal so that the duty cycle is determined by the digital signal, wherein the pulse duration modulator further comprises a circuit part (M) for periodically modulating the digital signal, each modulation period of the digital signal comprising a first time interval wherein the digital signal has a first value, and a second time interval wherein the digital signal has a second value, said first and second values being independently adjustable by the circuit part (M).

14. The circuit as claimed in claim 13 wherein each modulation period of the digital signal comprises N successive time intervals, N being a natural number, and the value of the digital signal can be adjusted during at least one of said time intervals by the circuit part (M) to a value that differs from the value during at least one other of said time intervals.

15. The circuit part as claimed in claim 13 wherein each modulation period of the digital signal comprises N successive time intervals, and the circuit part (M) is operative to adjust the duration of at least one of the successive time intervals.

16. The circuit as claimed in claim 15 wherein the circuit part (M) includes means for adjusting more than one of the time intervals of the digital signal in a modulation period thereof.

17. The circuit as claimed in claim 13 further comprising a second controlled switching element connected in series circuit with the first controlled switching element to the input terminals, wherein the control circuit derives a second control signal coupled to a control electrode of the second switching element for making the second switching element alternately conductive and nonconductive, and the pulse duration modulator supplies a second digital signal to the control circuit which adjusts the duty cycle of the second control signal so that the duty cycle of the second switching element is determined by the second digital signal, and the pulse duration modulator independently modulates the duty cycles of the first and second control signals.

18. The circuit as claimed in claim 14 wherein each modulation period of the digital signal comprises N successive time intervals, and wherein the circuit part (M) comprises a timer for timing the successive time intervals.

19. The circuit as claimed in claim 13 wherein the pulse duration modulator operates independently of an output voltage supplied to the load circuit.

20. The circuit arrangement as claimed in claim 1 further comprising a load circuit including output terminals for connection to a discharge lamp, and wherein the pulse duration modulator operates independently of an output voltage supplied to the load circuit by the inverter.

21. The circuit arrangement as claimed in claim 1 further comprising a load circuit coupled to the switching element and which includes first and second output terminals for connection to a discharge lamp, and wherein the circuit arrangement energizes the load circuit only in a pulse duration mode of operation.

* * * * *